(No Model.)
M. CROHN.
SAFETY DEVICE FOR SCARF PINS.
No. 521,103. Patented June 5, 1894.
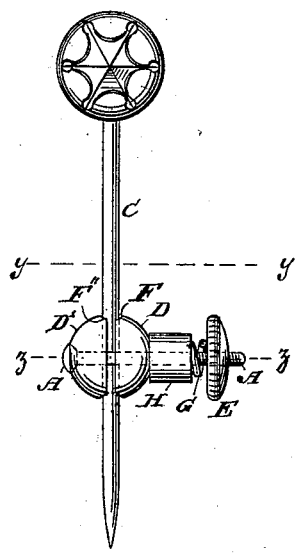
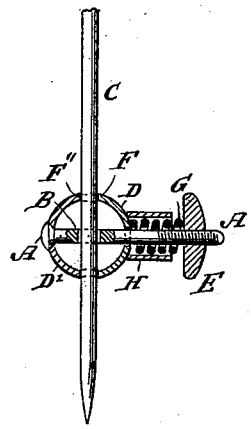
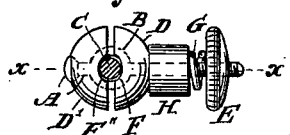
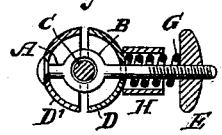
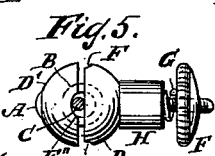
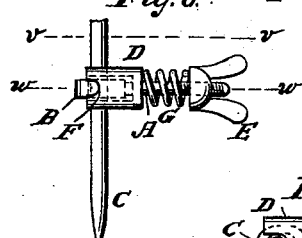
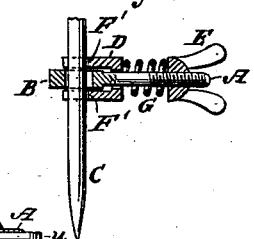
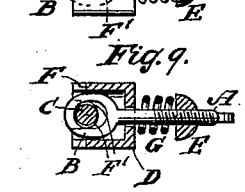
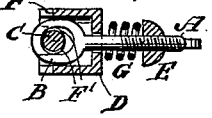
WITNESSES:
E. Wolff
Chas. E. Paensgen
INVENTOR:
Marcus Crohn.
BY
Hauff & Hauff
ATTORNEYS.
THE NATIONAL LITHOGRAPHING COMPANY,
WASHINGTON, D. C.

UNITED STATES PATENT OFFICE.

MARCUS CROHN, OF NEW YORK, N. Y.

SAFETY DEVICE FOR SCARF-PINS.

SPECIFICATION forming part of Letters Patent No. 521,103, dated June 5, 1894.

Application filed March 9, 1894. Serial No. 502,985. (No model.)

*To all whom it may concern:*

Be it known that I, MARCUS CROHN, a citizen of the United States, residing at New York, in the county and State of New York, have invented new and useful Improvements in Devices for Securing Scarf-Pins and other Articles, of which the following is a specification.

The object of this invention is to provide a reliable article for securing such objects as scarf pins, studs and the like and the invention consists in the novel features of construction set forth in the following specification and claims and illustrated in the annexed drawings, in which—

Figure 1 is a side elevation of the fastening device. Fig. 2 is a section along $xx$ Fig. 3. Fig. 3 is a section along $yy$ Fig. 1. Fig. 4 is a section along $zz$ Fig. 1. Fig. 5 is a view similar to Fig. 3 showing the device applied to a thinner pin than in Fig. 3. Fig. 6 is a side elevation of a modification. Fig. 7 is a section along $uu$ Fig. 8. Fig. 8 is a section along $vv$ Fig. 6. Fig. 9 is a section along $w w$ Fig. 6.

In the drawings the letter A indicates a screw stem having an eye or eye portion B into which can enter or pass a pin or shank C of such an article as a scarf pin, stud or the like. On the stem A is a clamp or slide D which can be actuated by nut E on stem A so that said clamp will jam or hold the pin C in eye B as in Figs. 7 to 9 so that said pin C cannot be withdrawn without loosening nut E.

The clamp or slide D in Figs. 6 to 9 is shown with two sets of recesses F and F'. The recesses or slots F and F' are adapted for the engagement of pin C and the slots F and F' are of different depths or size. If a pin of thicker diameter is to be secured the larger set of recesses is made to correspond with the pin, the smaller set of recesses being used for thinner pins, so that the pin can always be firmly secured in eye B by the clamp.

In Figs. 1 to 5 the clamp D has a counterpart D' secured to stem A and the pin C can be clamped between the parts D D'. The part D in Figs. 1 to 5 has recesses or indentations F and the part D' has indentations F''. When the indentations F F'' correspond (Fig. 3) the device is adapted for a pin of a certain thickness, but when part D is turned so that the indentations F F'' do not correspond (Fig. 5) the device is adapted for clamping a thinner pin.

A spring G can be applied to cause a yielding pressure to be exerted on clamp D and said spring will diminish the liability of the fastening dropping off or becoming lost since even if the nut E is somewhat loosened the spring G will still press clamp D toward pin C. A tube shell or housing H will conceal or protect the spring G.

What I claim as new, and desire to secure by Letters Patent, is—

1. A device for securing scarf pins and the like, consisting of a screw-stem having an eye for the passage of the pin or shank, a nut engaging the stem, a clamp mounted on the stem, movable along the same and provided with a recess to engage the pin or shank at a point remote from the eye, and a spring arranged on the stem between the said clamp and the said nut, substantially as described.

2. A screw stem provided with an eye adapted for the entrance of a pin or shank, a nut on said stem, a clamp actuated by the nut to engage the pin, and a spring interposed between the nut and the clamp substantially as described.

3. A screw stem provided with an eye adapted for the entrance of a pin or shank, a nut on said stem, a clamp actuated by the nut to engage the pin, a spring interposed between the nut and clamp, and a housing or shell for the spring substantially as described.

4. A screw stem provided with an eye adapted for the entrance of a pin or shank, a nut on said stem, and a clamp actuated by the nut to engage the pin, said clamp being composed of two sections located on opposite sides of the eye, one of the sections being connected to the screw stem and the other section being actuated by the nut substantially as described.

5. A device for securing scarf-pins and the like, consisting of a screw-stem having an eye for the passage of the pin or shank, a nut on the stem, and a clamp composed of two opposite notched sections D D' mounted on the screw-stem and between which the pin or shank is adapted to pass through the eye of the stem for clamping pins of varying thickness, substantially as described.

In testimony whereof I have hereunto set my hand in the presence of two subscribing witnesses.

MARCUS CROHN.

Witnesses:
WM. C. HAUFF,
E. F. KASTENHUBER.